US010642480B2

(12) United States Patent
Kim et al.

(10) Patent No.: US 10,642,480 B2
(45) Date of Patent: May 5, 2020

(54) MOBILE TERMINAL DISPLAYING MULTIPLE RUNNING SCREENS HAVING A PORTION OF CONTENT THAT IS THE SAME

(71) Applicant: LG ELECTRONICS INC., Seoul (KR)

(72) Inventors: Daebum Kim, Seoul (KR); Eunmin Youk, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 544 days.

(21) Appl. No.: 14/740,708

(22) Filed: Jun. 16, 2015

(65) Prior Publication Data
US 2015/0378590 A1 Dec. 31, 2015

(30) Foreign Application Priority Data
Jun. 25, 2014 (KR) .......................... 10-2014-0077974

(51) Int. Cl.
*G06F 3/0488* (2013.01)
*H04L 12/58* (2006.01)

(52) U.S. Cl.
CPC ........ *G06F 3/04883* (2013.01); *H04L 51/046* (2013.01); *H04L 51/08* (2013.01); *G06F 2203/04803* (2013.01)

(58) Field of Classification Search
None
See application file for complete search history.

(56) References Cited

U.S. PATENT DOCUMENTS

| 2010/0235732 | A1* | 9/2010 | Bergman | G06F 3/0488 715/702 |
| 2011/0252378 | A1* | 10/2011 | Anzures | G06F 9/451 715/835 |
| 2011/0314113 | A1* | 12/2011 | Noda | G06F 3/0481 709/206 |
| 2012/0026400 | A1* | 2/2012 | Kang | H04N 21/42214 348/570 |
| 2012/0304229 | A1* | 11/2012 | Choi | H04N 21/8173 725/41 |

(Continued)

*Primary Examiner* — Toan H Vu
(74) *Attorney, Agent, or Firm* — Lee Hong Degerman Kang & Waimey

(57) ABSTRACT

A mobile terminal and controlling method thereof are disclosed. The present invention includes a touchscreen and a controller controlling the touchscreen to output a running screen of a 1$^{st}$ application including a prescribed information, the controller receiving a handwriting input through the touchscreen, the controller controlling the touchscreen to output a running screen of a 2$^{nd}$ application mapped to the received 1$^{st}$ handwriting input to a prescribed region on the outputted running screen of the 1$^{st}$ application, wherein the running screen of the 2$^{nd}$ application includes at least one portion of the prescribed information. Accordingly, a control of running an application and a control of sending a message are facilitated based on a handwriting input.

16 Claims, 19 Drawing Sheets

(56) References Cited

U.S. PATENT DOCUMENTS

| | | | |
|---|---|---|---|
| 2012/0306781 A1* | 12/2012 | Hwang | G06F 3/0482 345/173 |
| 2013/0139045 A1* | 5/2013 | Inoue | G06F 17/243 715/224 |
| 2013/0300684 A1* | 11/2013 | Kim | G06F 3/0488 345/173 |
| 2013/0321314 A1* | 12/2013 | Oh | G06F 3/041 345/173 |
| 2014/0015776 A1* | 1/2014 | Kim | G06F 3/03545 345/173 |
| 2014/0018053 A1* | 1/2014 | Cho | G06F 3/0488 455/418 |
| 2014/0101577 A1* | 4/2014 | Kwak | G06F 1/1618 715/761 |
| 2015/0036928 A1* | 2/2015 | Sheth | G06K 9/00442 382/187 |
| 2015/0212647 A1* | 7/2015 | Kim | G02B 27/017 345/173 |
| 2015/0227282 A1* | 8/2015 | Oh | G06F 3/04883 715/863 |
| 2015/0365306 A1* | 12/2015 | Chaudhri | G06F 3/0416 715/736 |

* cited by examiner

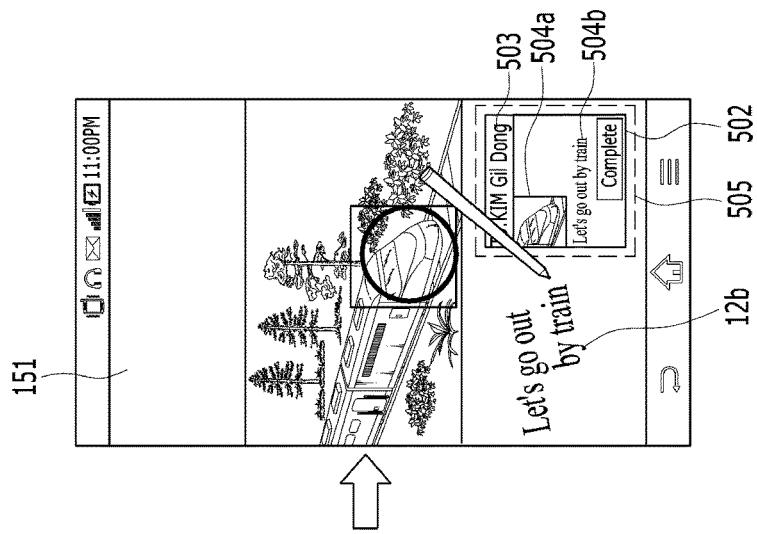
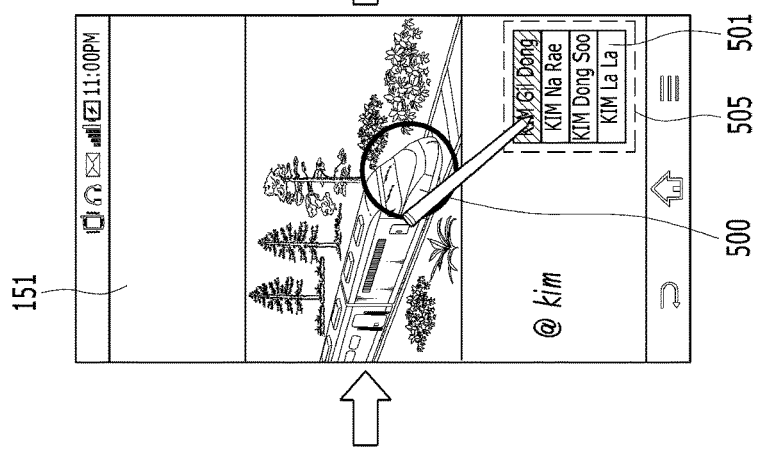
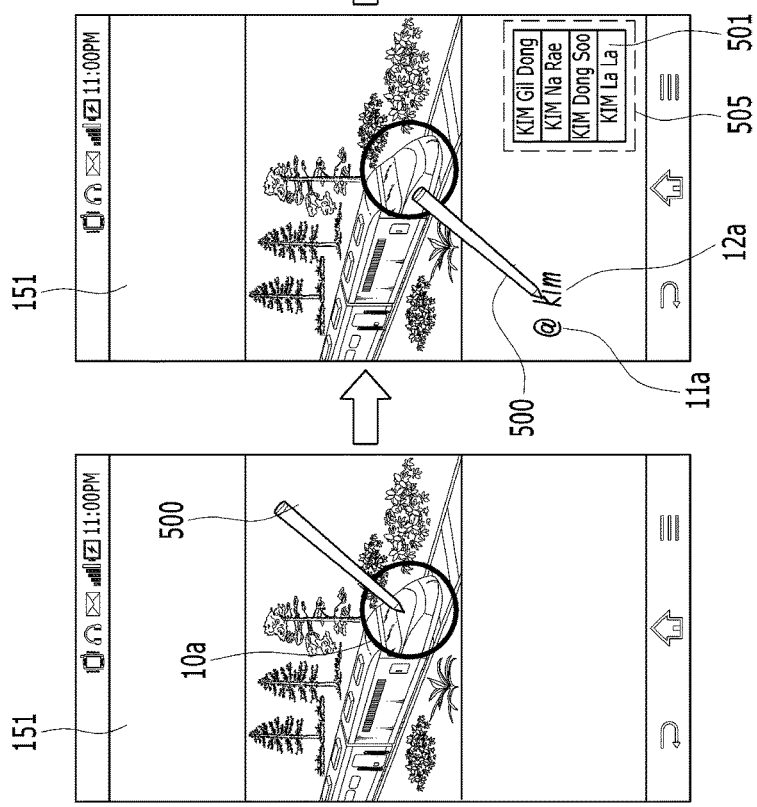

FIG. 19A
FIG. 19B
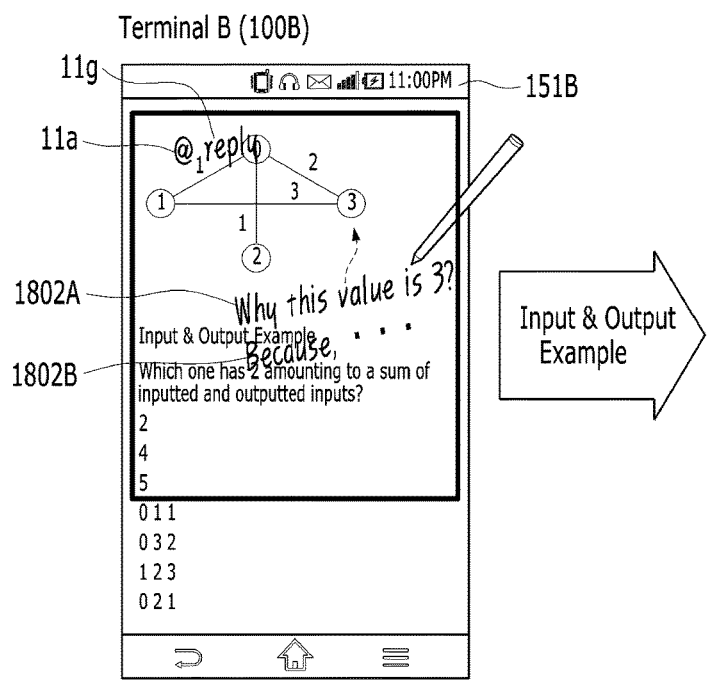
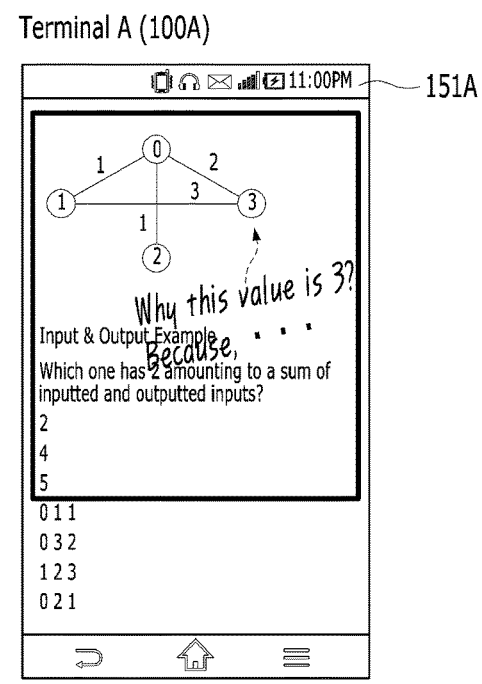

MOBILE TERMINAL DISPLAYING MULTIPLE RUNNING SCREENS HAVING A PORTION OF CONTENT THAT IS THE SAME

CROSS-REFERENCE TO RELATED APPLICATIONS

Pursuant to 35 U.S.C. § 119(a), this application claims the benefit of earlier filing date and right of priority to Korean Application No. 10-2014-0077974, filed on Jun. 25, 2014, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for facilitating the use of a terminal in further consideration of user's convenience.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, as a size of a display of a mobile terminal increases, many ongoing efforts are made to research and develop control methods using a stylus pen. In this case, the stylus pen means a pen for performing a display action such as an action of composing a text on a display, an action of drawing a picture on a display, or the like. Thus, the stylus pen is used to compose a text or draw a picture. And, the demand for researching and developing various control methods using a stylus pen is increasingly rising as well.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which a prescribed function can be easily activated based on a handwriting input through a stylus pen.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a touchscreen and a controller controlling the touchscreen to output a running screen of a $1^{st}$ application, the controller receiving a handwriting input including a touch & drag through the touchscreen, the controller controlling the touchscreen to output a running screen of a $2^{nd}$ application mapped to a prescribed mark included in the received handwriting input to a prescribed region on the outputted running screen of the $1^{st}$ application.

In this case, the $2^{nd}$ application may include an application for sending a message to a terminal mapped to a $1^{st}$ letter included in the received handwriting input.

And, the recognized $1^{st}$ letter may include a handwriting input adjacent to the recognized prescribed mark in the received handwriting input.

Moreover, if a path of the touch & drag forms a closed curve on the outputted running screen of the $1^{st}$ application, the controller may attach an image data corresponding to the closed curve to the message to be sent.

And, the controller may attach a $2^{nd}$ letter included in the received handwriting input to the message to be sent.

The mobile terminal may further include a memory configured to store a plurality of image data and the running screen of the $1^{st}$ application may include a thumbnail list of a plurality of the stored image data.

If a scroll command for the outputted thumbnail list is received, a prescribed region for outputting the $2^{nd}$ running screen may be outputted transparently.

If a scroll command for the outputted thumbnail list is received, a size of the prescribed region for outputting the $2^{nd}$ running screen can be automatically reduced.

And, the controller may recognize a $2^{nd}$ letter included in the received handwriting input and the $2^{nd}$ application may include an application for sending a message to a terminal mapped to the recognized $1^{st}$ letter.

Moreover, the mobile terminal may further include a stylus pen and the handwriting input may include an input through the stylus pen.

In another aspect of the present invention, as embodied and broadly described herein, a method of controlling a mobile terminal according to the present invention may include the steps of outputting a running screen of a $1^{st}$ application through a touchscreen, receiving a handwriting input including a touch & drag through the touchscreen, outputting a running screen of a $2^{nd}$ application mapped to a prescribed mark included in the received handwriting input to a prescribed region on the outputted running screen of the $1^{st}$ application.

In this case, the $2^{nd}$ application may include an application for sending a message to a terminal mapped to a $1^{st}$ letter included in the received handwriting input.

And, the recognized $1^{st}$ letter may include a handwriting input adjacent to the recognized prescribed mark in the received handwriting input.

Moreover, if a path of the touch & drag forms a closed curve on the outputted running screen of the $1^{st}$ application, the method may further include the step of attaching an image data corresponding to the closed curve to the message to be sent.

And, the method may further include the step of attaching a $2^{nd}$ letter included in the received handwriting input to the message to be sent.

The mobile terminal may further include a memory configured to store a plurality of image data and the running screen of the $1^{st}$ application may include a thumbnail list of a plurality of the stored image data.

If a scroll command for the outputted thumbnail list is received, a prescribed region for outputting the $2^{nd}$ running screen may be outputted transparently.

If a scroll command for the outputted thumbnail list is received, a size of the prescribed region for outputting the $2^{nd}$ running screen can be automatically reduced.

And, a $2^{nd}$ letter included in the received handwriting input may be recognized and the $2^{nd}$ application may include an application for sending a message to a terminal mapped to the recognized $1^{st}$ letter.

Moreover, the mobile terminal may further include a stylus pen and the handwriting input may include an input through the stylus pen.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the preferred embodiments of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIGS. 5A, 5B, 5C and 5D are diagrams for a control method of recognizing a letter input applied by a user and then controlling a mobile terminal based on the recognized letters according to one embodiment of the present invention;

FIGS. 18A, 18B, 19A and 19B are diagrams for a control method of sharing a handwriting input among a plurality of terminals according to one embodiment of the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
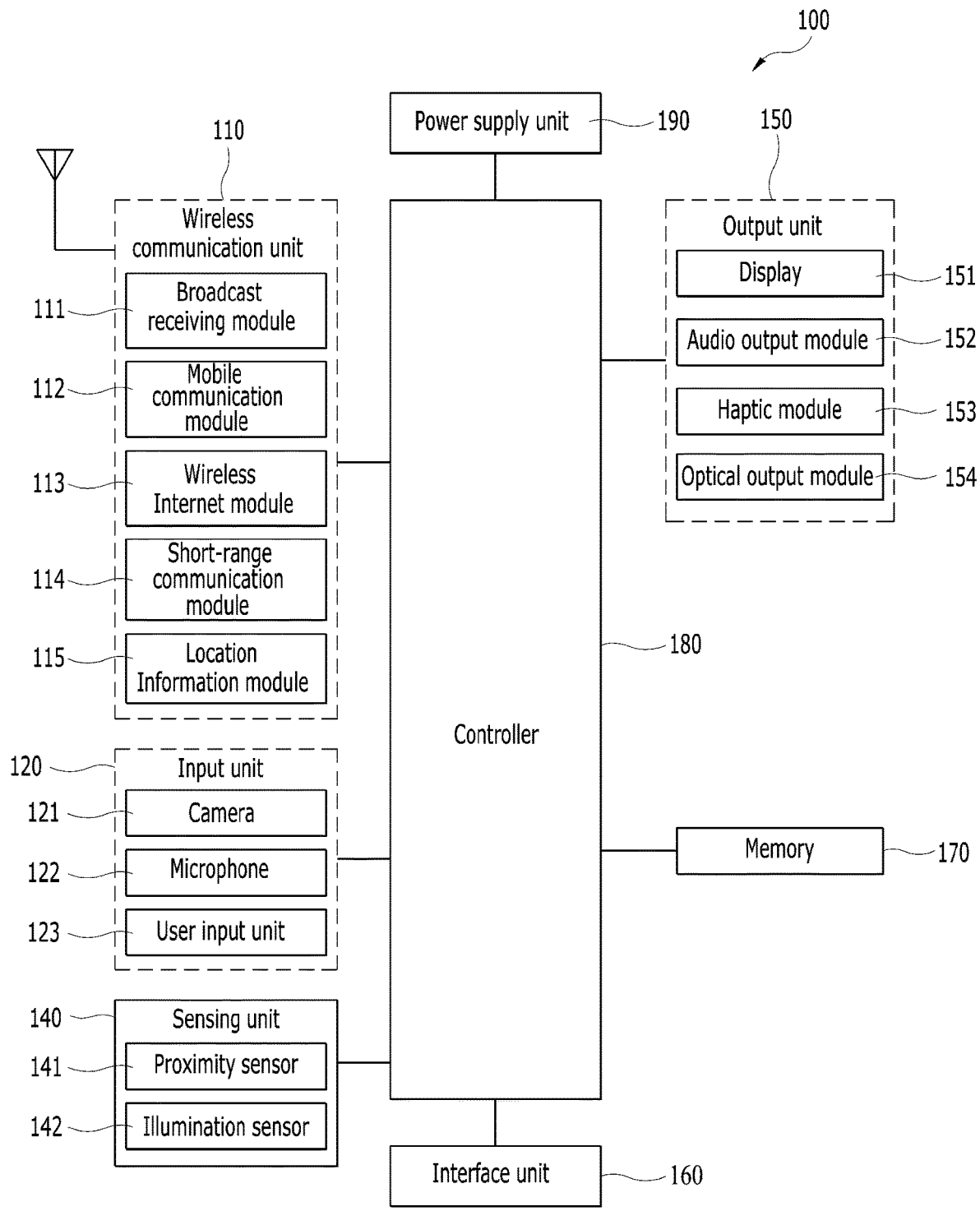
FIG. 1 is a block diagram of a mobile terminal in accordance with the present disclosure.
Figure 2:
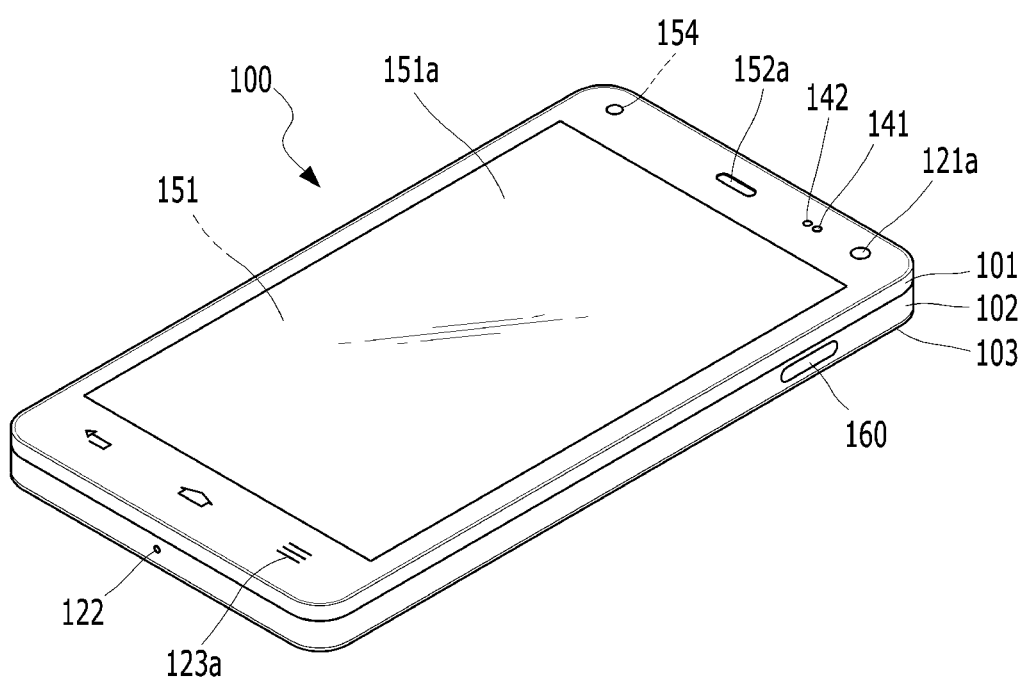
FIGS. 2 and 3 are conceptual views of one example of the mobile terminal, viewed from different directions.
Figure 3:
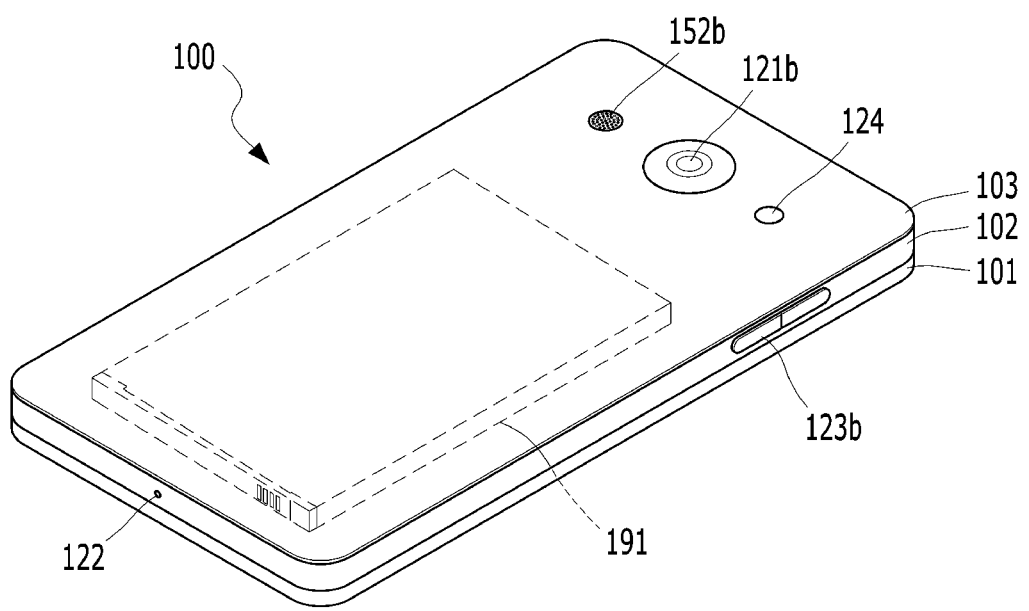

Reference is now made to FIGS. 1-3, where FIG. 1 is a block diagram of a mobile terminal in accordance with the present disclosure, and FIGS. 2 and 3 are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIGS. 1-3 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 2 and 3, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

FIGS. 2 and 3 depict certain components as arranged on the mobile terminal. However, it is to be understood that alternative arrangements are possible and within the teachings of the instant disclosure. Some components may be omitted or rearranged. For example, the first manipulation unit 123*a* may be located on another surface of the terminal body, and the second audio output module 152*b* may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1). Therefore, the touch screen may replace at least some of the functions of the first manipulation unit 123*a*.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 2 illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 3, a flash 124 is shown adjacent to the second camera 121b. When an image of a subject is captured with the camera 121b, the flash 124 may illuminate the subject.

As shown in FIG. 2, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

Owing to portability of a mobile terminal, a size of a display tends to increases gradually to meet the user's needs despite limitation put on the display size. As a size of a touchscreen increases more, a user can check more information at a time and is also able to apply a finer touch input through the touchscreen. If a touch assistive tool other than a user's finger is used in applying a touch input to a touchscreen, the corresponding input can be applied more accurately and finely. For example, the touch assistive tool may include one of a stylus pen and a touch pen. The stylus pen may mean the pen for putting a mark in a manner of writing letters on a display, drawing a picture on a display, or the like.

In the following description of an embodiment of the present invention, a stylus pen is taken as one example of a touch assistive tool, by which the present invention is non-limited. For instance, the touch assistive tool may include other input tools capable of applying an input to a touchscreen.

A mobile terminal according to one embodiment of the present invention can recognize a user's handwriting received through a stylus pen. In particular, when a user writes letters on a touchscreen using a stylus pen, the controller 180 can recognize the corresponding letters. The letters may include letters of various languages such as Hangeul (Korean alphabets), English alphabets, and the like.

An input through a stylus pen is advantageous in applying a fine touch input but may be inconvenient to apply an input for controlling a mobile terminal. According to one embodiment of the present invention, functions of a mobile terminal are mapped to at least one or more letters. If a recognized handwriting corresponds to one of the at least one or more letters, it is proposed to activate the function mapped to the corresponding letter. A detailed control method is described in detail with reference to the accompanying drawings as follows.

Figure 4:
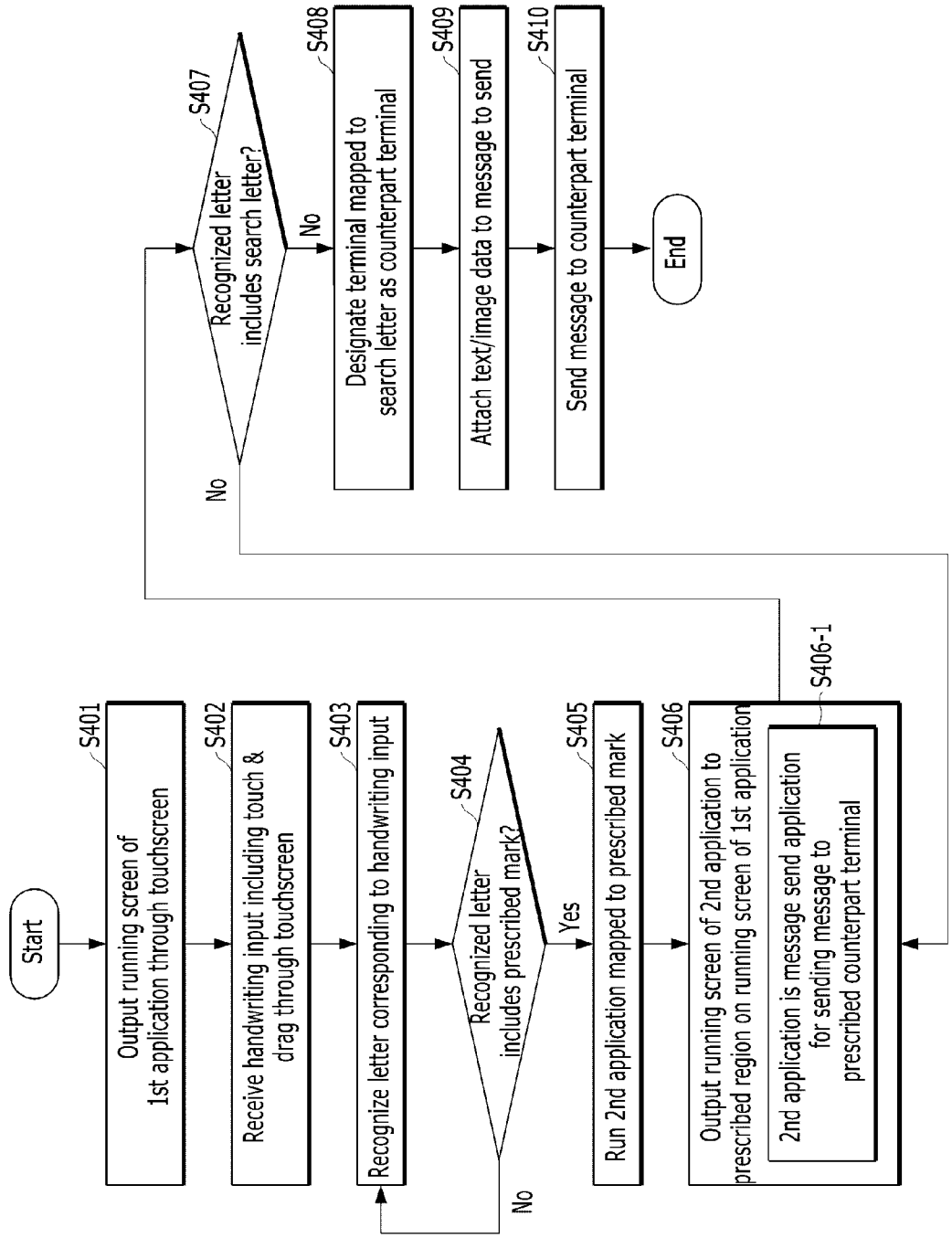
FIG. 4 is a flowchart for a method of controlling a mobile terminal based on letters recognized from a user's handwriting input according to one embodiment of the present invention.

FIG. 4 is a flowchart for a method of controlling a mobile terminal based on letters recognized from a user's handwriting input according to one embodiment of the present invention. FIGS. 5A, 5B, 5C and 5D are diagrams for a control method of recognizing a letter input applied by a user and then controlling a mobile terminal based on the recognized letters according to one embodiment of the present invention.

Referring to FIGS. 4 and 5A to 5D, in a step S401, the controller 180 outputs a running screen of a $1^{st}$ application through the touchscreen 151. Referring to FIG. 5A, the controller 180 currently outputs a gallery application for outputting image data as the 1st application through the touchscreen 151.

In a step S402, the controller 180 receives a handwriting input including a touch & drag through the touchscreen 151. In this case, a touch & drag input means an input performed in a manner of applying a touch to one point of the touchscreen, moving to another point by maintaining the touch, and then releasing the touch. A user's handwriting input may include at least one touch & drag input. The touch & drag input is performed through a stylus pen 500, by which a touch input tool is non-limited.

In a step S403, the controller 180 recognizes a letter corresponding to a user's handwriting input. According to one embodiment of the present invention, the letters are the symbols for human communication and may include language symbols (e.g., Hangeul (Korean alphabets), English alphabets, etc.) and other marks (e.g., an exclamation mark, a period, @, etc.). According to an embodiment mentioned in the following description, a letter inputted by a user may mean an input through a recognition of a handwriting input. And, the marks may be used as the concept of including the rest of letters except language symbols.

According to one embodiment of the present invention, it is proposed to run an application mapped to a corresponding mark based on the mark inputted by a user. In particular, if a $1^{st}$ mark is inputted, the controller 180 may run a $1^{st}$ application. If a $2^{nd}$ mark is inputted, the controller 180 may run a $2^{nd}$ application.

Referring to FIG. 5B, a user inputs a handwriting including a $1^{st}$ mark 11a using a stylus pen. If the $1^{st}$ mark 11a is recognized through the handwriting input, the controller 180 may run a $2^{nd}$ application mapped to the $1^{st}$ mark 11a [S405]. In a step S406, the controller 180 can output a running screen of the $2^{nd}$ application through the touchscreen 151. Referring to FIG. 5B, the running screen of the $2^{nd}$ application may be outputted to a prescribed region 505 on the running screen of the $1^{st}$ application. According to the example shown in FIGS. 5A to 5D, the run $2^{nd}$ application includes a text message send application [S406-1]. In particular, in running a specific application, a user can run the specific application conveniently and simply using an input of a previously agreed mark.

The running screen of the $2^{nd}$ application outputted through the prescribed region may include a running screen generated from reducing a size of the former running screen outputted through a full screen of the touchscreen at a predetermined rate. Alternatively, since a size of the prescribed region is relatively smaller than that of a full output screen, the running screen of the end application outputted through the prescribed region may include a screen from which a prescribed information displayed on the running screen of the $2^{nd}$ application is omitted or a screen from which a prescribed function of the $2^{nd}$ application is omitted. For instance, if the functions of the $2^{nd}$ application include a function of sending a text message, a function of sending an emoticon, a function of VoIP (Voice over IP) and the like, it is able to output a running screen capable of sending a text message only through the prescribed region.

Meanwhile, in case of a text message send application, it is necessary for a specific counterpart to be selected from contacts by a user. Yet, it is able to send a text message to a terminal of the selected specific counterpart. Such an action of selecting a counterpart terminal is mainly performed on a previously saved contact list. Nonetheless, in order for a user to quickly search a contact list for a desired counterpart, it may require an additional control method. Therefore, according to one embodiment of the present invention, proposed is a control method of facilitating a selection of a counterpart terminal based on a letter inputted in continuation with the mark input.

Referring to FIG. 5B, the user inputs a search letter 12a in continuation with the input of the $1^{st}$ mark 11a. The search letter 12a is the letter for searching for a name saved in contacts to designate a counterpart terminal. According to one embodiment of the present invention, the search letter 12a may be limited to a letter inputted to a location adjacent to the $1^{st}$ mark 11a.

In a step S407, the controller 180 determines whether the search letter 12a is included in the recognized letters. In a step S408, in response to the input of the search letter 12a, the controller 180 can designate a counterpart terminal. In particular, the controller 180 searches the contacts based on the search letter 12a and is then able to output a result of the search as a list 501 (hereinafter named a contact list). Subsequently, the controller 180 can designate a counterpart terminal selected from the outputted contact list 501 as the counterpart terminal. Referring to FIG. 5C, the selecting input may include an input of touching a corresponding contact item in the outputted contact list 501.

In a step S409, the controller 180 attaches text/image data to a message to send. In a step S410, the controller 180 can control the wireless communication unit 110 to send the message to the counterpart terminal.

The image data attached to the message to be sent may include a partial screen of an image designated based on a user's touch & drag input. For instance, if the received touch & drag input forms a closed curve (cf., a reference number 10a shown in FIG. 5A), the controller 180 can attach an image created from capturing a running screen of a region designated by the closed curve.

On the other hand, the text data attached to the message to be sent may include a data generated from recognizing a user's handwriting input. Referring to FIG. 5D, assume that a user has inputted 'Let's go out by train' onto the touchscreen 151 with a handwriting input. The controller 180 recognizes the inputted handwriting and is then able to attach the recognized handwriting input to the message. In the following description, the handwriting input attached to the message shall be named attachment letter(s) 12b.

Meanwhile, the search letter 12a and the attachment letter 12b need to be recognized in a manner of being distinguished from each other. According to one embodiment of the present invention, if a letter is adjacent to the mark 11a, the mark 11b or the like, it shall be determined as the search letter 12a. If a letter is not adjacent to the mark 11a, the mark 11b or the like, it shall be determined as the attachment letter 12b. In particular, the controller 180 can control a letter, which is inputted in continuation with the input of the mark 11a, the mark 11b or the like, to be used for a search. And, the controller 180 can control other inputted letters to be attached to a message.

If the counterpart terminal is designated on the outputted contact list 501 [FIG. 5C], the controller 180 can output a message send screen 502 to a prescribed region 505 of the running screen of the $1^{st}$ application [FIG. 5D]. In this case, the message send screen outputs information related to the message to be sent. The information on the text message to be sent may include a counterpart terminal information 503 of the counterpart terminal selected in FIG. 5C, an attached text data 504b and an attached photo data 504a. After the user has checked the information displayed on the message send screen, the user can easily send the message by touching a confirmation button. In particular, according to the above-described embodiment of the present invention, using the stylus pen 500 only, a message can be sent in a manner of easily attaching image/text data and easily designating a counterpart terminal.

According to the above embodiment, a control method of attaching image data and text data is described. A control method of controlling a location (sequence) of attaching each of the image data and the text data is described in detail with reference to FIG. 6 as follows.

Figure 6A:
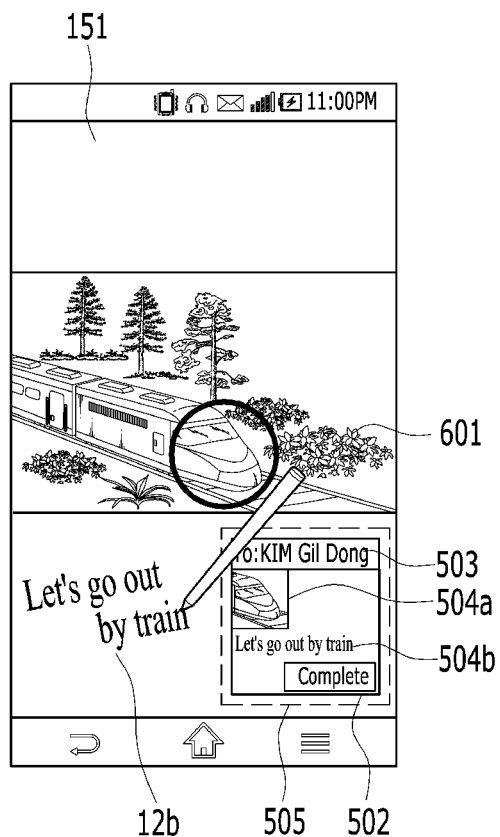
FIGS. 6A and 6B are diagrams for a configuration of controlling an attachment sequence of image/text data attached to a message to be sent according to one embodiment of the present invention.
Figure 6B:
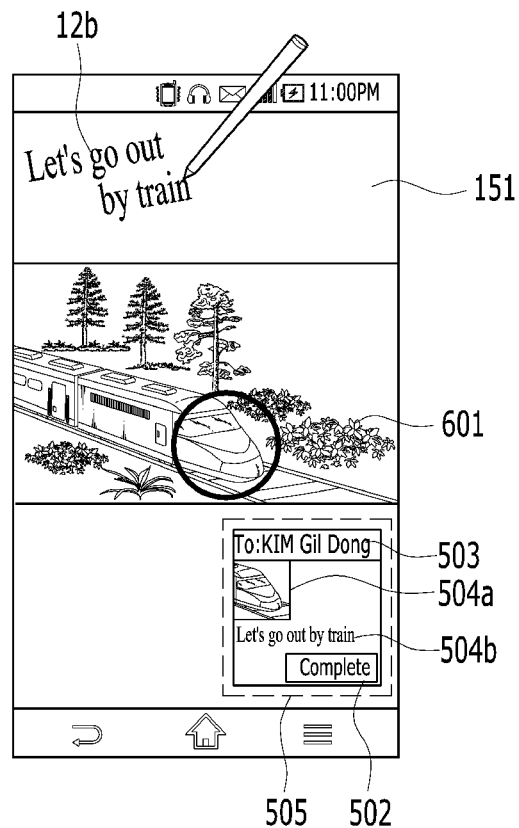

FIGS. 6A and 6B are diagrams for a configuration of controlling an attachment sequence of image/text data attached to a message to be sent according to one embodiment of the present invention;

Referring to FIG. 6A, if an attachment letter 12b is inputted below an outputted image data 601, the controller 180 attaches an image data 504a to an upper part of a message to be sent and is also able to attach a text data 504b to a lower part of the message [cf. a message send screen 502 shown in FIG. 6A].

Referring to FIG. 6B, if an attachment letter 12b is inputted above an outputted image data 601, the controller 180 attaches an image data 504a to a lower part of a message to be sent and is also able to attach a text data 504b to an upper part of the message [cf. a message send screen 502 shown in FIG. 6B].

Meanwhile, a location of a prescribed region 505 for outputting a running screen of a $2^{nd}$ application can be automatically shifted in accordance with a handwriting input received location. Such an embodiment is described in detail with reference to FIGS. 7A and 7B as follows.

Figure 7A:
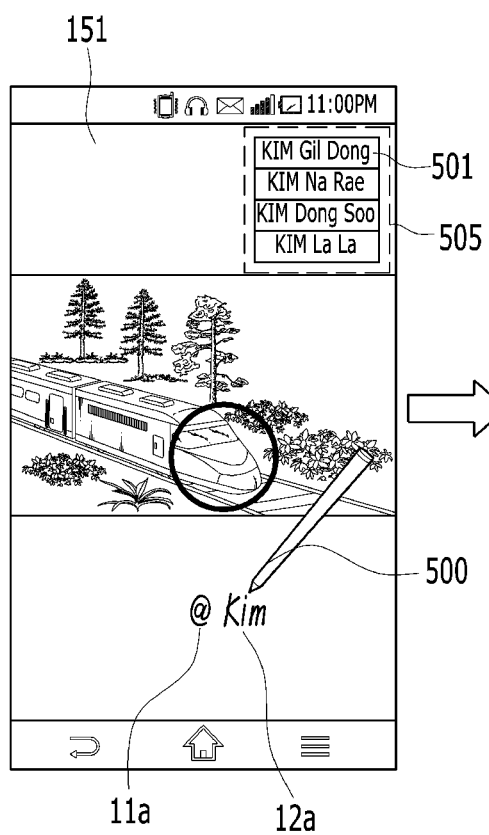
FIGS. 7A and 7B are diagrams for a configuration of adjusting a location of a running screen of a $2^{nd}$ application depending on a received location of a handwriting input according to one embodiment of the present invention.
Figure 7B:
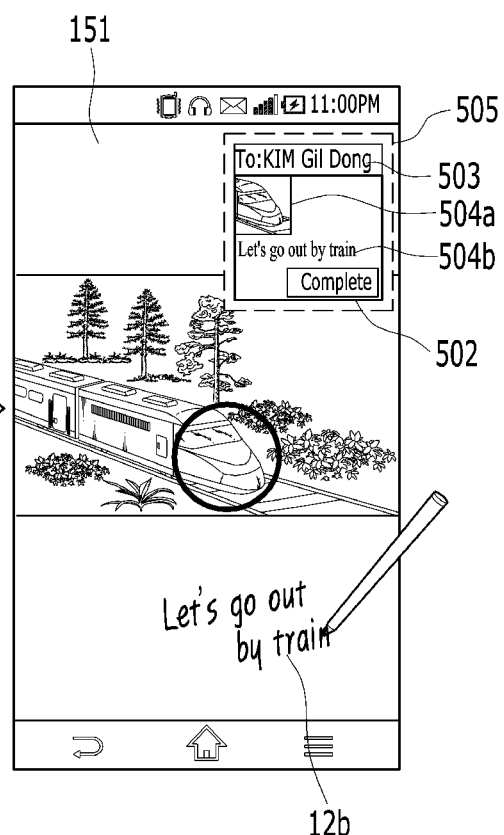

FIGS. 7A and 7B are diagrams for a configuration of adjusting a location of a running screen of a $2^{nd}$ application depending on a received location of a handwriting input according to one embodiment of the present invention;

According to one embodiment of the present invention, it is proposed that a running screen is outputted without overlapping a handwriting input received region. In particular, referring to FIG. 7A, if a handwriting including a $1^{st}$ mark 11a and a search letter 12a is inputted, the controller 180 can output a running screen of a $2^{nd}$ application to a prescribed region 505 failing to overlap a location to which the handwriting is inputted.

Subsequently, referring to FIG. 7B, if an attachment letter 12b is recognized, the controller 180 controls the recognized attachment letter 12b to be included in a text message to be sent and is then able to display the recognized attachment letter 12b on a message send screen 502.

As mentioned in the foregoing description, according to one embodiment of the present invention, an application is controlled to be selected in accordance with an identified mark. One embodiment for running a $3^{rd}$ application in response to an input of a $2^{nd}$ mark 11b is described in detail with reference to FIGS. 8A and 8B as follows.

Figure 8A:
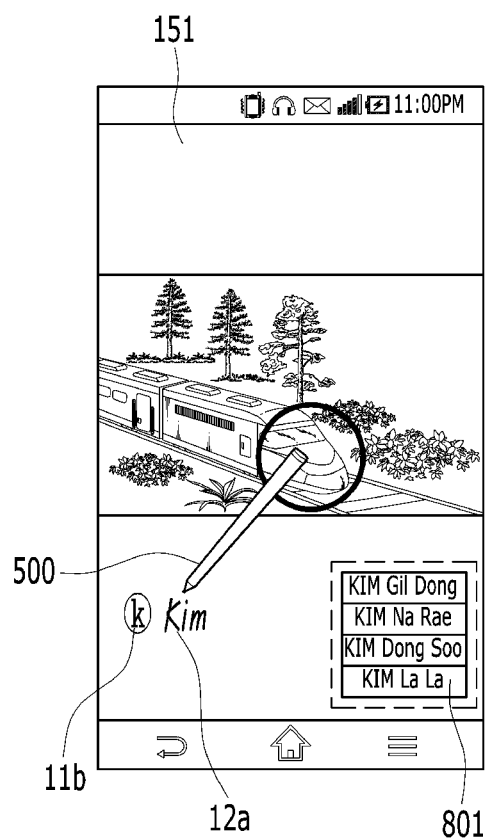
FIGS. 8A and 8B are diagrams for a control method of running a $3^{rd}$ application in case of recognizing a $2^{nd}$ mark (11b) according to one embodiment of the present invention.
Figure 8B:
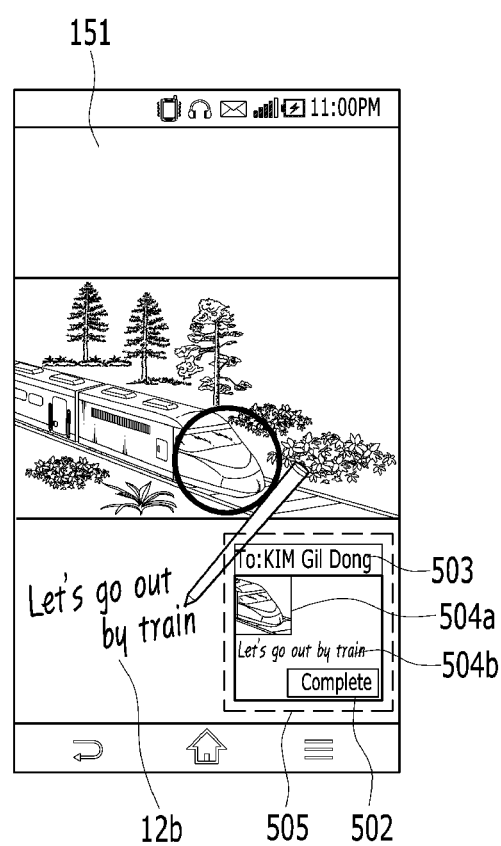

FIGS. 8A and 8B are diagrams for a control method of running a $3^{rd}$ application in case of recognizing a $2^{nd}$ mark (11b) according to one embodiment of the present invention;

Referring to FIG. 8A, a user inputs a $2^{nd}$ mark 11b and a search letter 12a through a handwriting input. The controller 180 runs a $3^{rd}$ application mapped to the recognized $2^{nd}$ mark 11b and is able to output a running screen of the $3^{rd}$ application to a prescribed region. According to the example shown in FIG. 8, the $3^{rd}$ application may include another message transceiving application. Assuming that at least two types of message transceiving applications exist, it is able to specify one of a plurality of message transceiving applications.

Likewise, the running screen of the $3^{rd}$ application may include an output of a contact list 801 searched based on the recognized search letter 12*a*.

Meanwhile, in case of the message transceiving application, it is able to separately use a contact list in the corresponding application. In this case, the outputted contact list 801 may include a contact list included in the $3^{rd}$ application.

If a prescribed item is selected form the outputted contact list 801, as mentioned in the foregoing description, it is able to output a message send screen 502 [FIG. 8B].

Thus, the above-described embodiment relates to a control method of sending a message in the course of outputting image data. The above-described control method may be performed on a thumbnail list of image data as well. Such an embodiment is described in detail with reference to FIGS. 9A and 9B as follows.

Figure 9A:
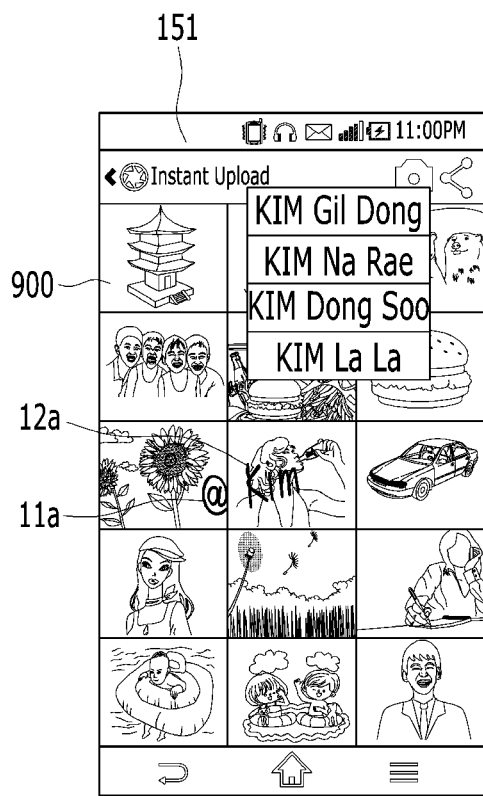
FIGS. 9A and 9B are diagrams for a control method of a message transmission on a thumbnail list of image data according to one embodiment of the present invention.
Figure 9B:
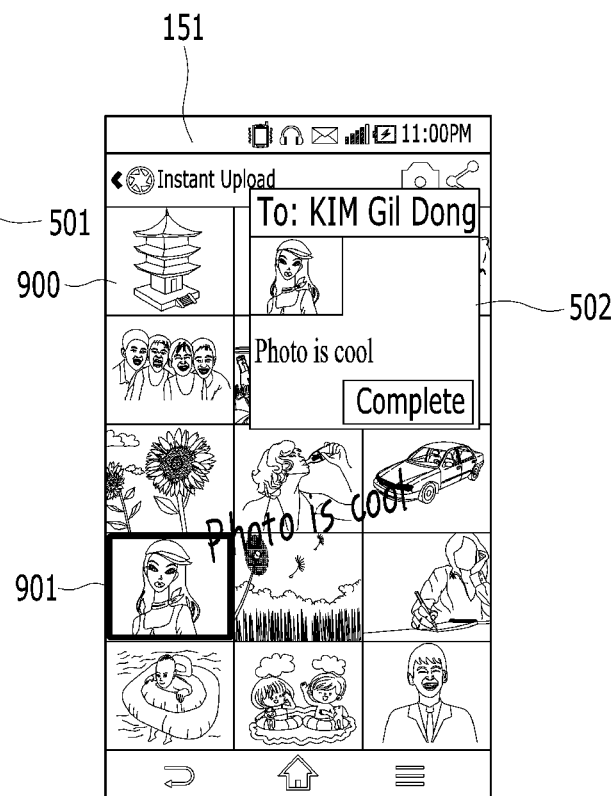

FIGS. 9A and 9B are diagrams for a control method of a message transmission on a thumbnail list of image data according to one embodiment of the present invention;

Referring to FIG. 9A, the controller 180 currently outputs a thumbnail list 900 for a plurality of image data through the touchscreen 151.

If a $1^{st}$ mark 11*a* is inputted, the controller 180 runs a $2^{nd}$ application mapped to the $1^{st}$ mark 11*a* and is able to output a running screen of the run $2^{nd}$ application to a prescribed region of the touchscreen 151.

Subsequently, the controller 180 recognizes a search letter 12*a* and is then able to output a contact list 501 searched based on the recognized search letter 13*a* to the prescribed region. If a prescribed item is selected from the contact list 501, referring to FIG. 9B, the controller 180 sets a counterpart terminal corresponding to the selected item as a receiving terminal and is then able to output a message send screen 502.

A selection of one image data may include an input performed in a manner of touching a prescribed item on the outputted thumbnail list 900. An identifiable effect 901 may be given to the selected item displayed on the thumbnail list 900.

Likewise, if an attachment letter 12*b* is recognized, referring to FIG. 9B, the controller 180 can attach the recognized attachment letter 12*b* to a message to be sent.

Meanwhile, in case that at least two image data are selected from the thumbnail list 900, all the selected image data can be attached. Such an embodiment is described in detail with reference to FIGS. 10A and 10B as follows.

Figure 10A:
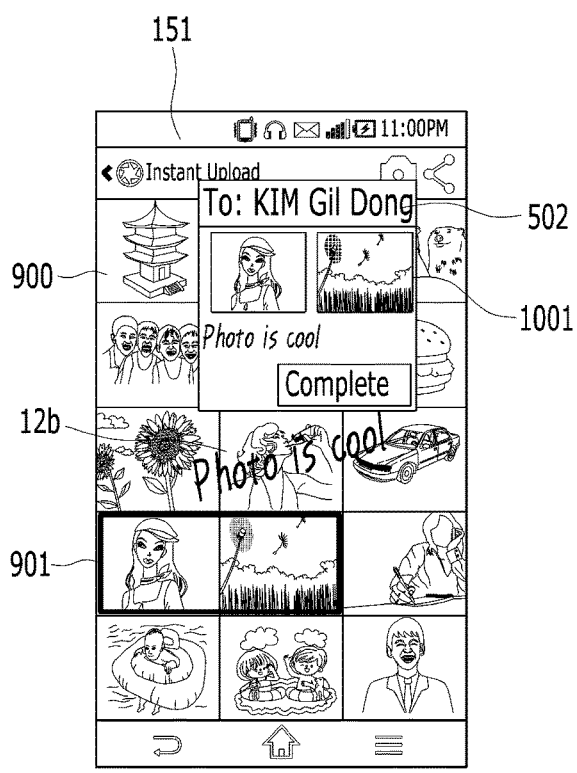
FIGS. 10A and 10B are diagrams for two kinds of examples of an image data attached format in case of selecting a plurality of image data according to one embodiment of the present invention.
Figure 10B:
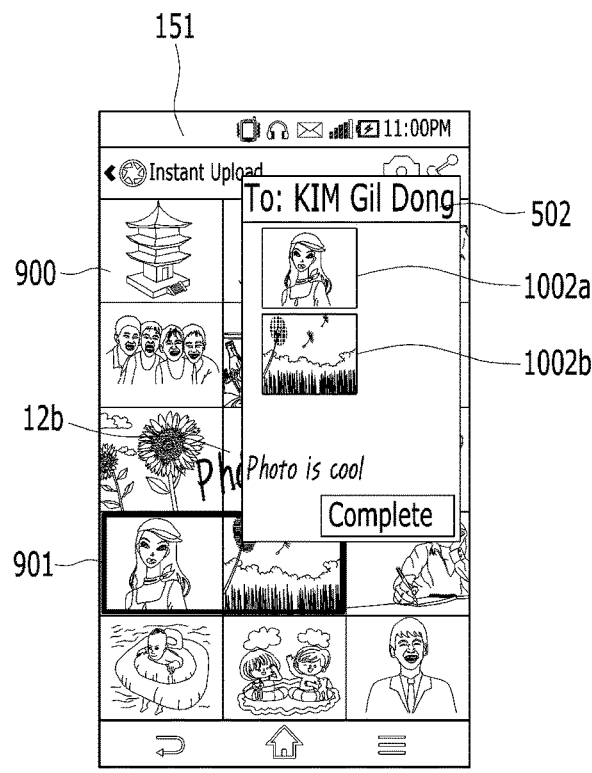

FIGS. 10A and 10B are diagrams for two kinds of examples of an image data attached format in case of selecting a plurality of image data according to one embodiment of the present invention;

Referring to FIG. 10A, the controller 180 outputs a thumbnail list 900.

A selection of at least two image data may include an input of touching each of a plurality of items on the outputted thumbnail list 900. An identifiable effect 901 may be given to each of the selected items displayed on the thumbnail list 900.

If a plurality of image data are selected, they can be attached in one of two formats.

According to a $1^{st}$ format, referring to FIG. 10A, a plurality of the selected image data are integrated into a single image data. Subsequently, the integrated image data 1001 can be attached to a message send screen 502.

According to a $2^{nd}$ format, referring to FIG. 10B, a plurality of the selected image data can be attached as a plurality of individual image data 1002*a* and 1002*b*, respectively.

In each of the two formats, if an attachment letter 12*b* is recognized, the controller 180 may be able to attach the recognized attachment letter 12*b* to the message send screen 502 together with the corresponding image data.

According to the embodiment described with reference to FIG. 10, an input of touching each of a plurality of image data is taken as an example of a method of selecting a plurality of image data. Yet, it may be able to select a plurality of image data though a touch & drag input.

Figure 11A:
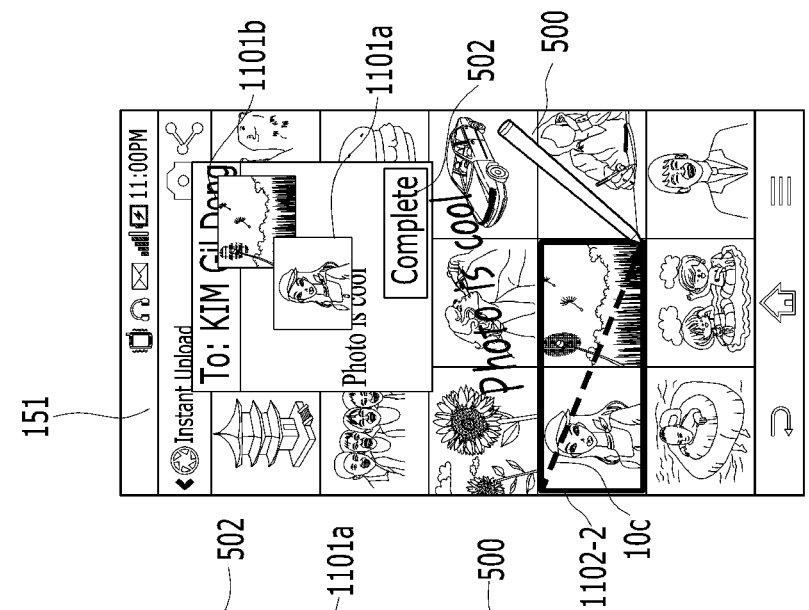
FIGS. 11A, 11B and 11C are diagram for a control method of selecting a plurality of items from a thumbnail list according to one embodiment of the present invention.
Figure 11B:
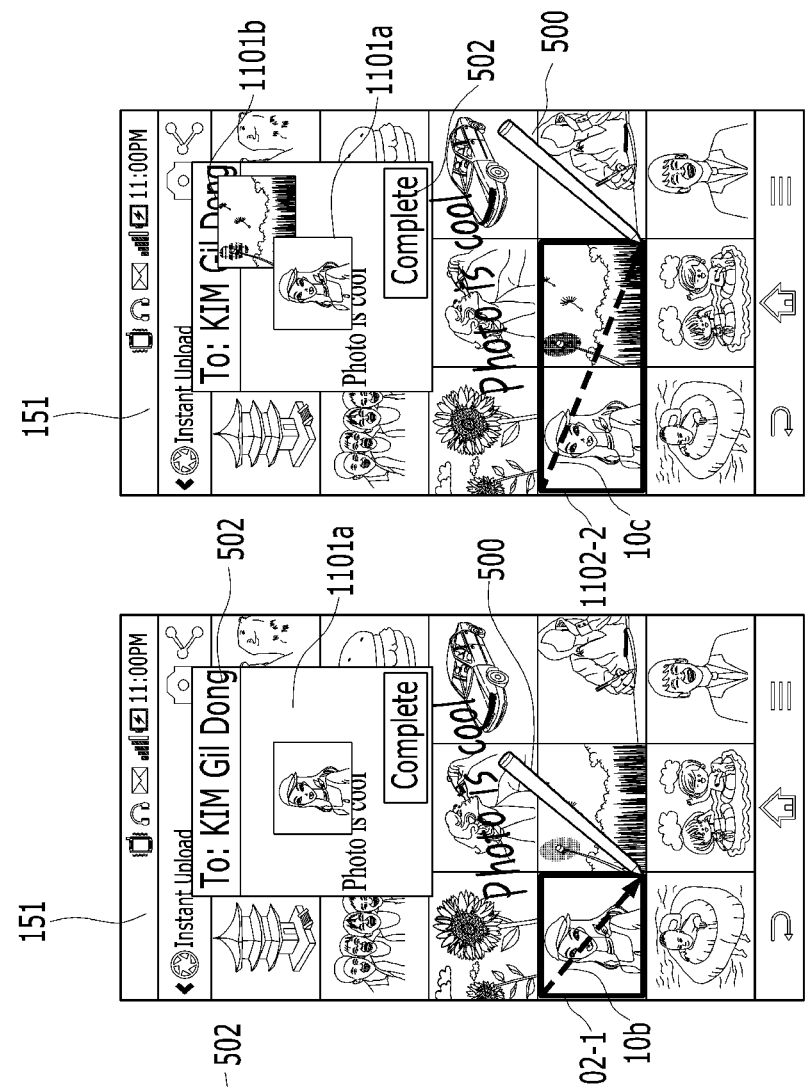
Figure 11C:
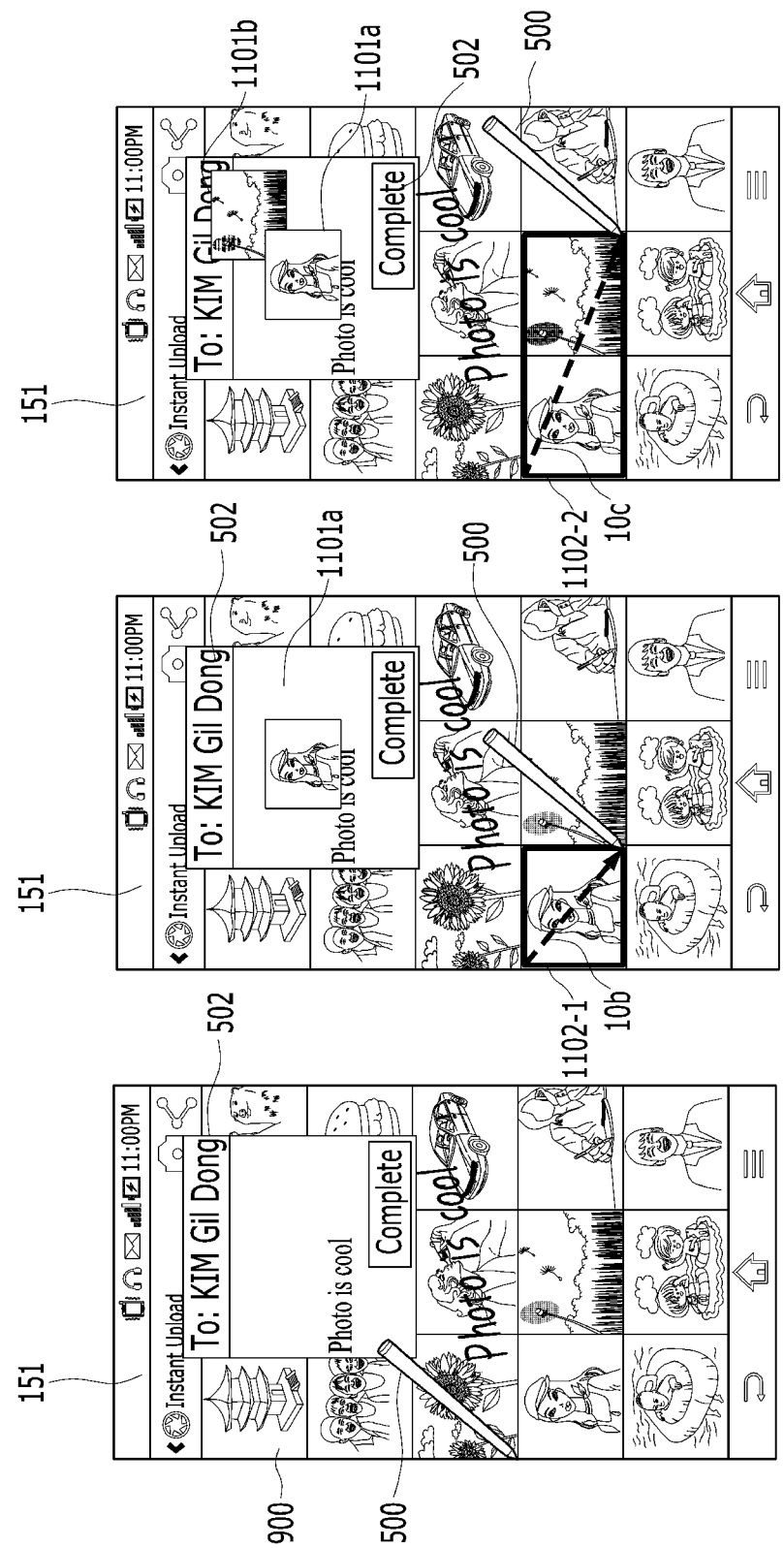

FIGS. 11A, 11B and 11C are diagram for a control method of selecting a plurality of items from a thumbnail list according to one embodiment of the present invention;

Referring to FIGS. 11A to 11C, a thumbnail list 900 is currently outputted. The controller 180 is able to select a plurality of images in response to a touch & drag input 10*b* applied to the outputted thumbnail list 900. In particular, the controller 180 can select at least one or more image data included in a selected region 1102-1 or 1102-2 having start and end points of the touch & drag input 10*b* as two corners.

Referring to FIG. 11B, a single image is included in the selected region 1102-1. The controller 180 attaches the single image included in the selected region 1102-1 and is then able to display the attached image 1101*a* on a message send screen 502.

Referring to FIG. 11C, two images are included in the selected region 1102-2. The controller 180 attaches the two images included in the selected region 1102-2 and is then able to display the two attached images 1101*a* and 1101*b* on the message send screen 502.

Meanwhile, since a running screen of an application including the aforementioned contact list 501 and the aforementioned message send screen 502 is outputted in a manner of blocking a portion of a thumbnail list, it may not be easy for a user to check a desired image data. Therefore, according to one embodiment of the present invention, the following is proposed. First of all, the controller 180 recognizes a location of a stylus pen 500 on the touchscreen 151. Secondly, the controller 180 controls an outputted location of a running screen of an application based on the recognized location.

Figure 12A:
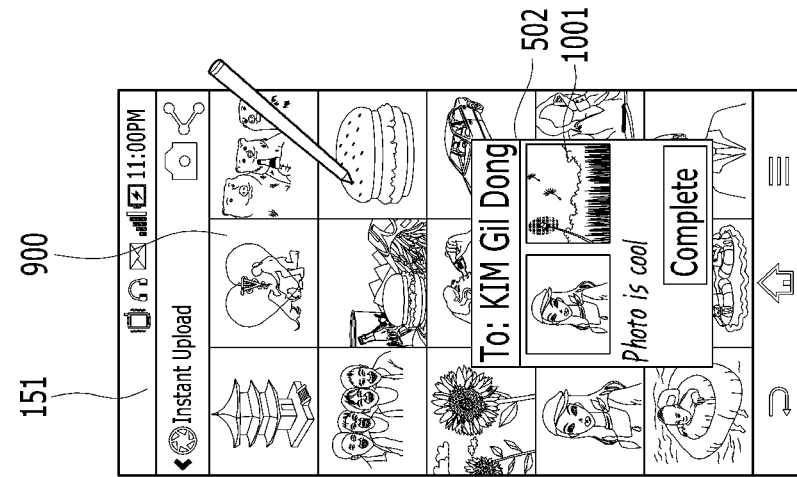
FIGS. 12A, 12B and 12C are diagrams for a configuration of controlling a location of a running screen of an application based on a location of a stylus pen (500) recognized from a touchscreen (151) according to one embodiment of the present invention.
Figure 12B:
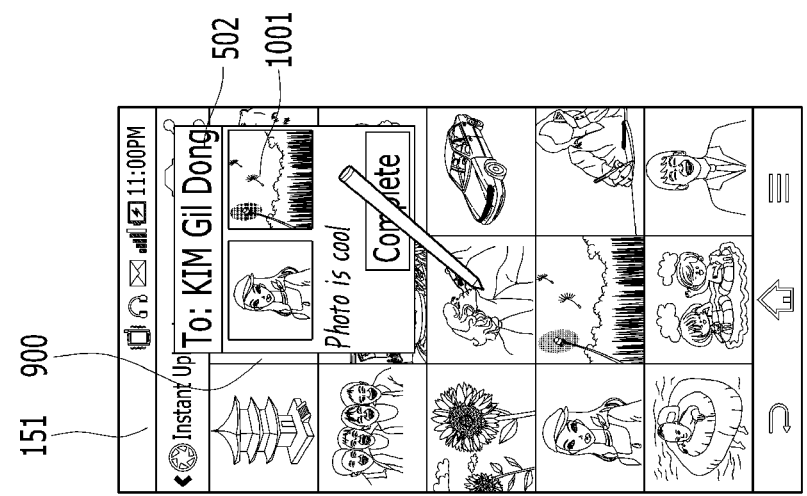
Figure 12C:
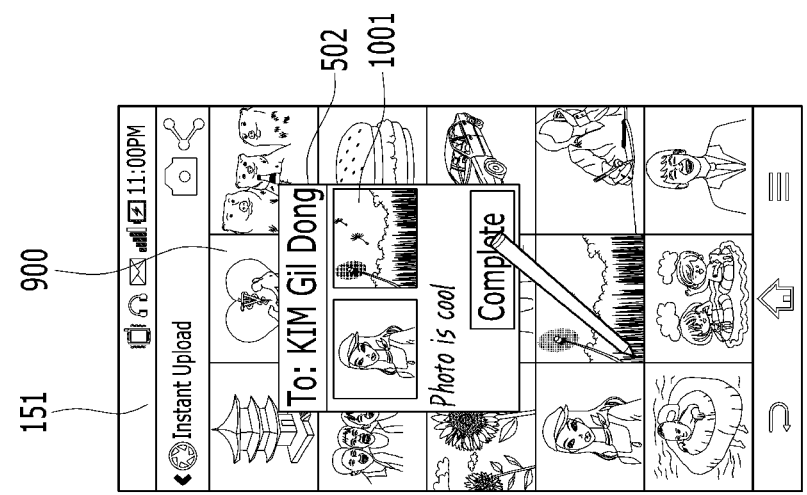

FIGS. 12A, 12B and 12C are diagrams for a configuration of controlling a location of a running screen of an application based on a location of a stylus pen (500) recognized from a touchscreen (151) according to one embodiment of the present invention;

According to one embodiment of the present invention, regarding a location of a stylus pen 500, it is able to detect a location proximate to the touchscreen 151 as well as a location of a direct touch contacting the touchscreen 151. In this case, it may be able to detect the proximate location through a proximity sensor.

Based on the detected location of the stylus pen 500, the controller 180 can shift a location of a running screen of an application.

Referring to FIG. 12A, a message send screen 502 is currently outputted from a thumbnail list 900 on a running screen of an application. The outputted message send screen 502 can be shifted like a floating popup window in order not to overlap the detected location of the stylus pen 500 [FIG. 12A, FIG. 12B].

The message send screen 520 outputted from the thumbnail list blocks the thumbnail list. According to one embodiment of the present invention, a control method of clearing (i.e., making transparent) or reducing a message send screen (502) in response to a scroll command is proposed. Such an embodiment is described in detail with reference to FIGS. 13A, 13B, 14A and 14B as follows.

Figure 13A:
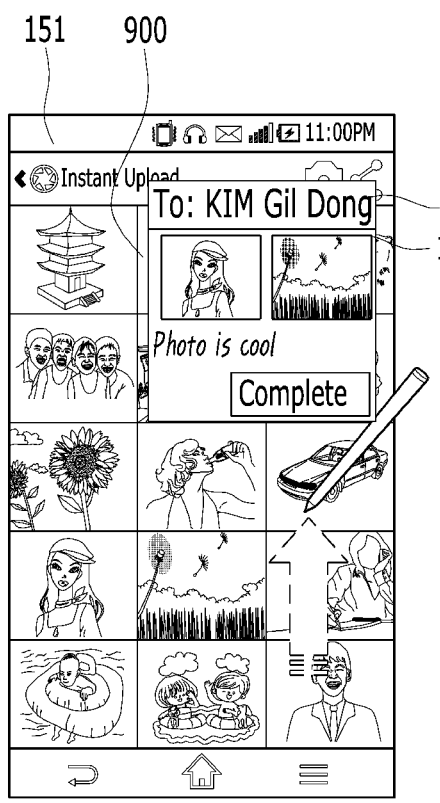
FIGS. 13A, 13B, 14A and 14B are diagrams for configurations of a control method of clearing or reducing a message send screen (502) in response to a scroll command according to one embodiment of the present invention.
Figure 13B:
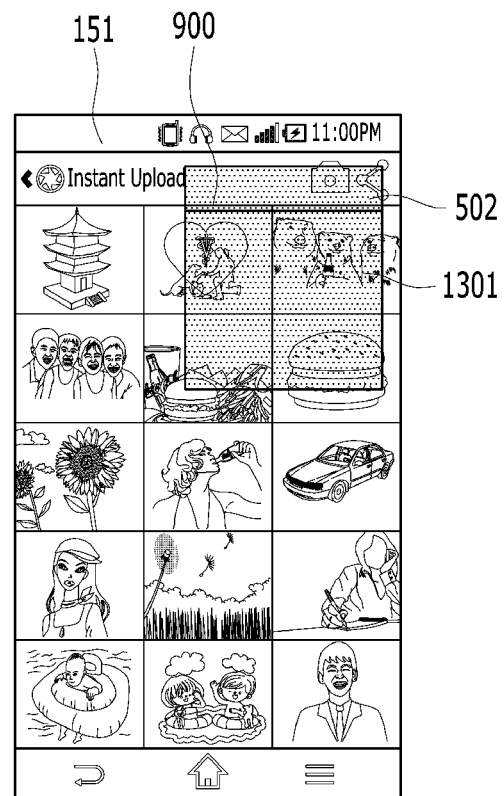

FIGS. 13A, 13B, 14A and 14B are diagrams for configurations of a control method of clearing or reducing a message send screen (502) in response to a scroll command according to one embodiment of the present invention;

Referring to FIG. 13A and FIG. 13B, the controller 180 currently outputs a message send screen 520 through a prescribed region on a thumbnail list 900 and receives a scroll command for the thumbnail list 900.

According to one embodiment of the present invention, referring to FIG. 13B, if the scroll command is received, the controller 180 controls the outputted message send screen 520 to become transparent.

Figure 14A:
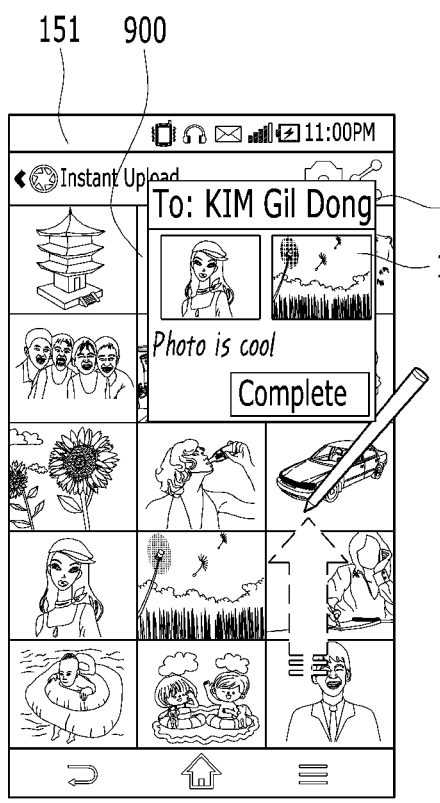
Figure 14B:
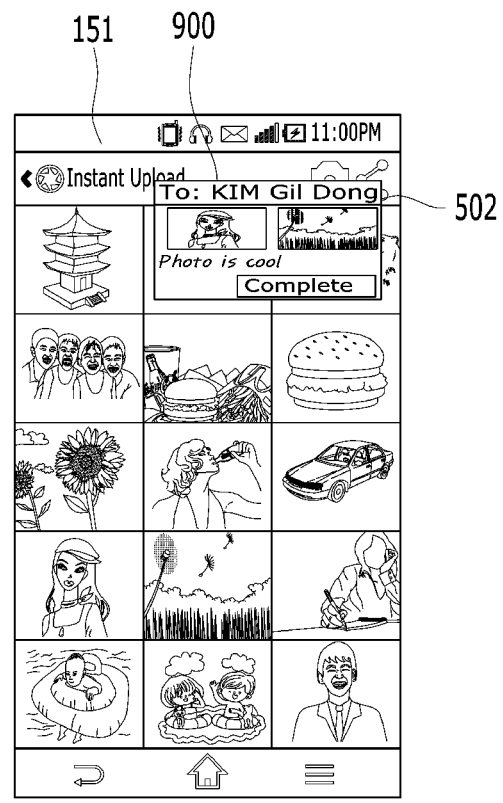

According to one embodiment of the present invention, referring to FIG. 14B, if the scroll command is received, the controller 180 controls the outputted message send screen 520 to be reduced in size.

According to the foregoing embodiments, one example of running a gallery application is described. Yet, the present invention can be modified and applied to various applications. In the following description, a case of applying the aforementioned embodiment of the present invention to a document application is explained with reference to FIG. 15.

Figure 15A:
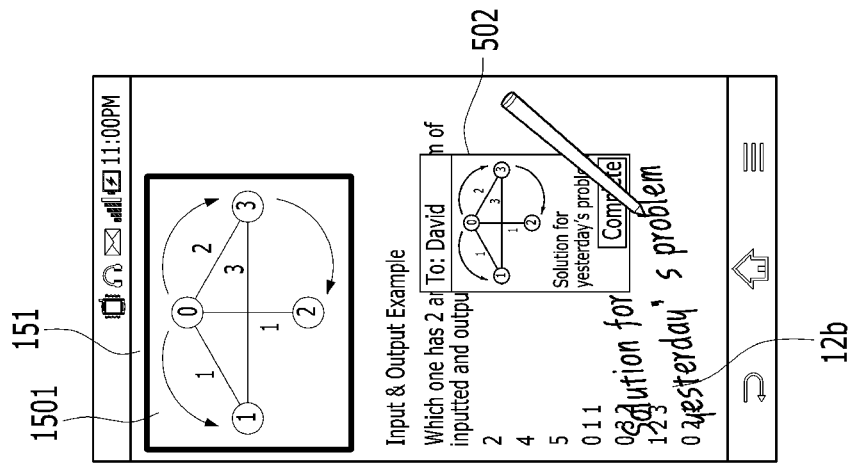
FIGS. 15A, 15B and 15C are diagrams to describe a case of applying one embodiment of the present invention onto a text application.
Figure 15B:
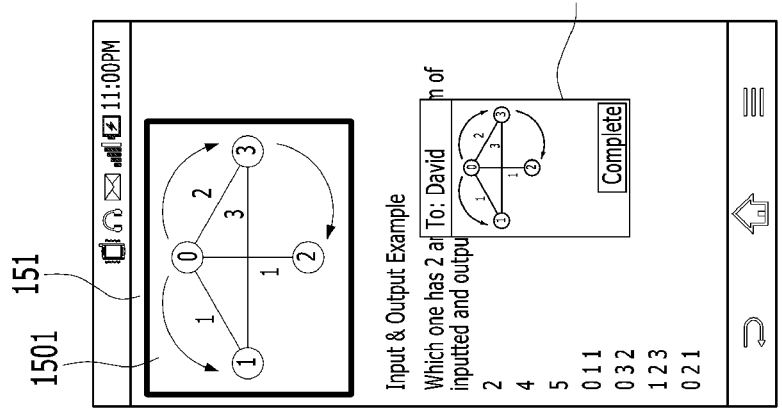
Figure 15C:
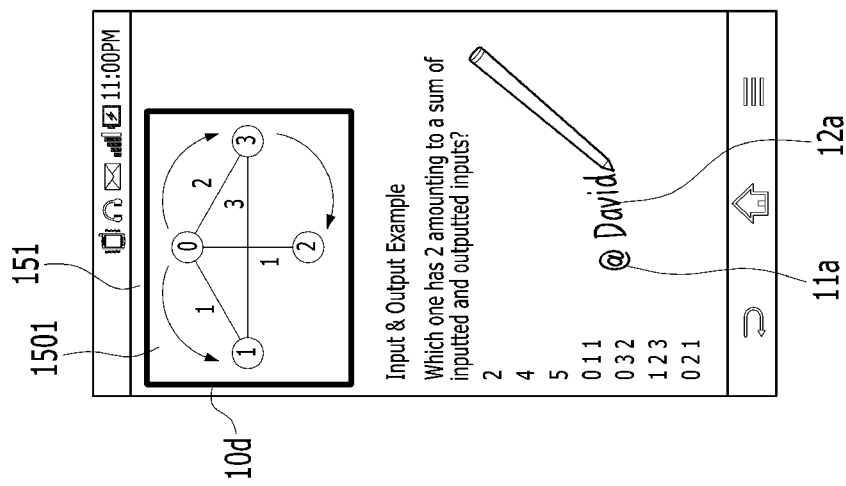

FIGS. 15A, 15B and 15C are diagrams to describe a case of applying one embodiment of the present invention onto a text application;

Referring to FIGS. 15A to 15C, the controller 180 currently outputs a running screen of a document application. The controller 180 receives a handwriting input including a touch & drag through the touchscreen 151 and recognizes a letter corresponding to the user's handwriting input. If a 1st mark 11a is recognized through the handwriting input, the controller 180 runs a $2^{nd}$ application mapped to the $1^{st}$ mark 11a and is then able to output a running screen of the $2^{nd}$ application through the running screen of the $1^{st}$ application.

Referring to FIG. 15A, the user inputs a search letter 12a in continuation with the $1^{st}$ mark 11a. In response to the input of the search letter 12a, referring to FIG. 15B, the controller 180 designates a counterpart terminal and is then able to display the designated counterpart terminal (David) on the message send screen 502.

Moreover, if the received touch & drag input forms a closed curve (indicated by a reference number 10d shown in FIG. 15A), the controller 180 may attach an image 1501 created from capturing a running screen of the region designated by the closed curve [FIG. 15B].

If an attachment letter 12b is recognized, the controller 180 can attach the recognized attachment letter 12b (e.g., 'solution for a yesterday's problem' shown in FIG. 15C) to a message to be sent.

Meanwhile, according to the embodiment described with reference to FIG. 15, it is proposed to output the message send screen 502 separate from the running screen of the document application. In FIG. 16, it is proposed to output a preview screen of a message sending from a running screen of a document application itself.

Figure 16A:
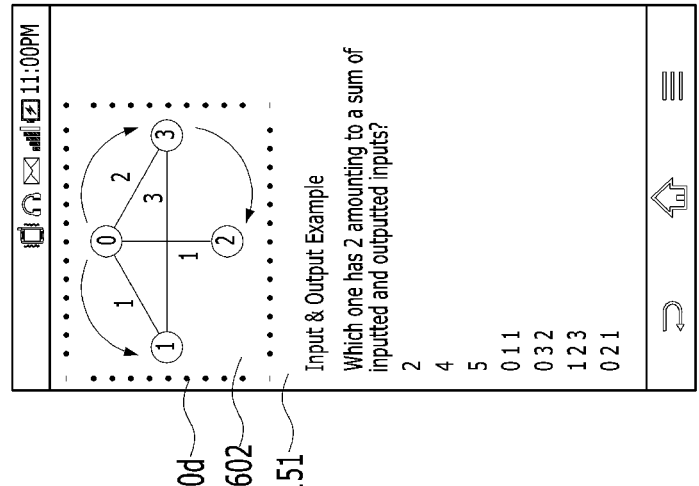
FIGS. 16A, 16B and 16C are diagrams for a configuration of directly outputting a message preview screen from a running screen of a background application according to one embodiment of the present invention.
Figure 16B:
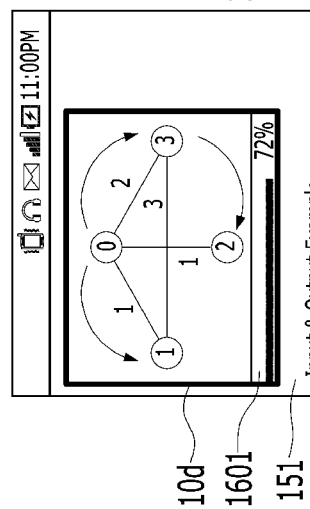
Figure 16C:
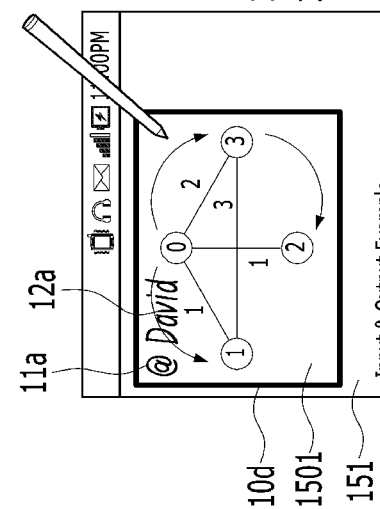

FIGS. 16A, 16B and 16C are diagrams for a configuration of directly outputting a message preview screen from a running screen of a background application according to one embodiment of the present invention;

According to the aforementioned embodiment, if the input of the touch & drag 10d including the closed curve is received, the controller 180 attaches the image (hereinafter named a capture image) 1501, which is created from capturing the running screen of the region designated by the corresponding closed curve, to the message to be sent. Yet, according to an embodiment shown in FIG. 16A, instead of outputting a preview image through the message send screen of the message to be sent, it is proposed to use the region designated by the closed curve as the preview screen.

If a message send command is received, referring to FIG. 16B, the controller 180 sends the capture image to a counterpart terminal and also outputs a progressive bar 1601 to guide a sent state of the capture image 1501.

If the message sending is complete, the controller 180 returns to the running screen of the previous background application and is also able to give an identifiable effect 1602 to the capture image sent region.

Meanwhile, according to another embodiment of the present invention, it is proposed to output another file data to a region designated by a closed curve. Such an embodiment is described in detail with reference to FIGS. 17A to 17D as follows.

Figure 17A:
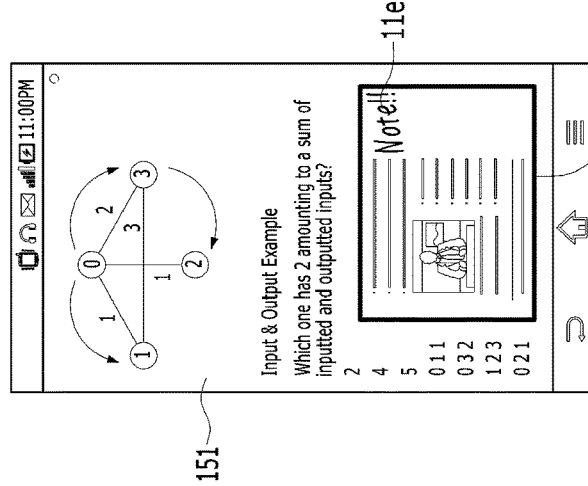
FIGS. 17A, 17B, 17C and 17D are diagrams for a configuration of outputting a different file data from a region designated by a closed curve according to one embodiment of the present invention.

FIGS. 17A, 17B, 17C and 17D are diagrams for a configuration of outputting a different file data from a region designated by a closed curve according to one embodiment of the present invention; and Referring to FIG. 17A, a closed curve 1700 is designated on a running screen of a document application through a touch input from a user. If a file designation letter 12c is inputted together with a $1^{st}$ mark 11a, referring to FIG. 12C, the controller 180 outputs a file data list 1701 mapped to the file designation letter 12c. In this case, the file designation letter 12c is the letter for designating a format (i.e., extension) of a file to attach and may include ppt, xlsx, or the like.

Figure 17B:
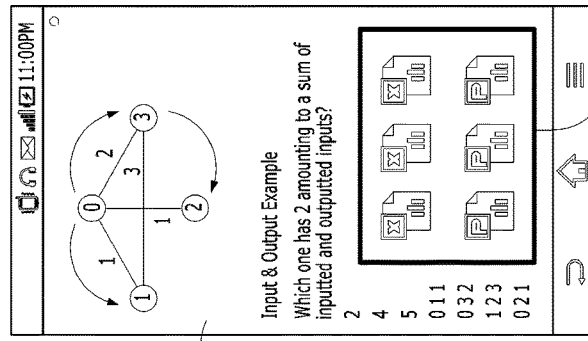
Figure 17C:
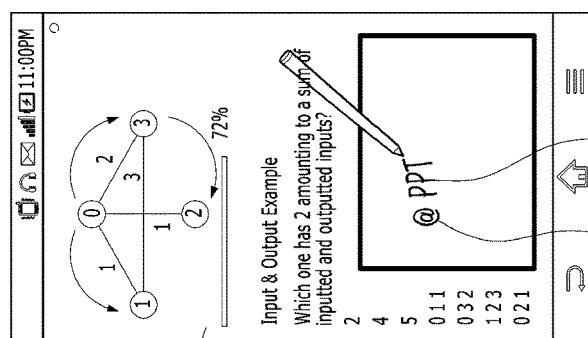
Figure 17D:
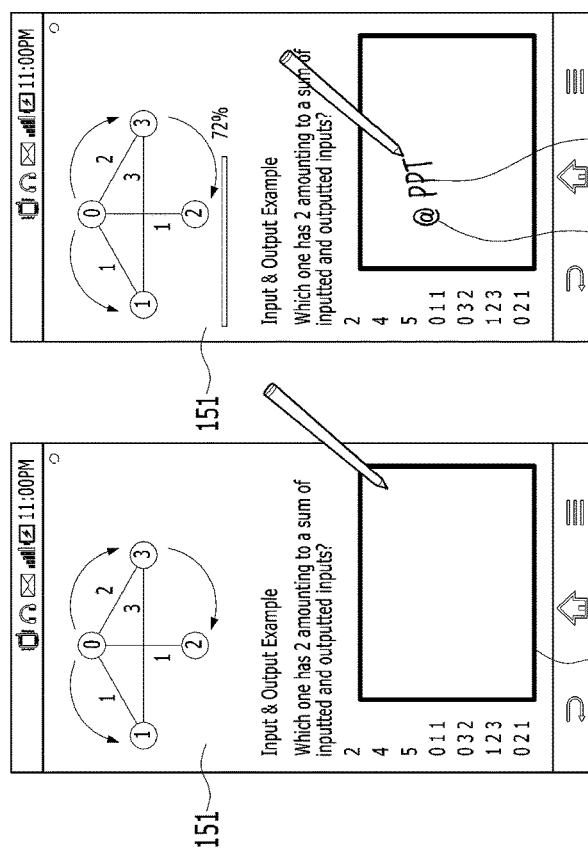

Referring to FIG. 17B, if 'ppt' is received as the file designation letter 12c, the controller 180 searches file extensions for a file data having the extension 'ppt' and is then able to output a file data list 1701 of the found file data.

If a prescribed item is selected form the file data list 1701, the controller 180 can output the selected file data 1702 to a region of the designated closed curve 1700. Moreover, an additional handwriting input 11e may be further displayed on the outputted file data 1702.

According to one embodiment of the present invention, further proposed is a control method of sharing a handwriting memo among a plurality of mobile terminals 100A, 100B . . . . Such an embodiment is described in detail with reference to FIGS. 18A, 18B, 19A and 19B as follows.

FIGS. 18A, 18B, 19A and 19B are diagrams for a control method of sharing a handwriting input among a plurality of terminals according to one embodiment of the present invention.

Referring to FIG. 18 and FIG. 19, a user A of a terminal A 100A draws a closed curve 1801 to designate a region to share on a running screen of an application. If a share command is received, the designated region can be shared with a specific counterpart terminal. The region (hereinafter named a shared region) designated with the closed curve 1801 can be shared with a terminal B 100B that is the counterpart terminal.

Figure 18A:
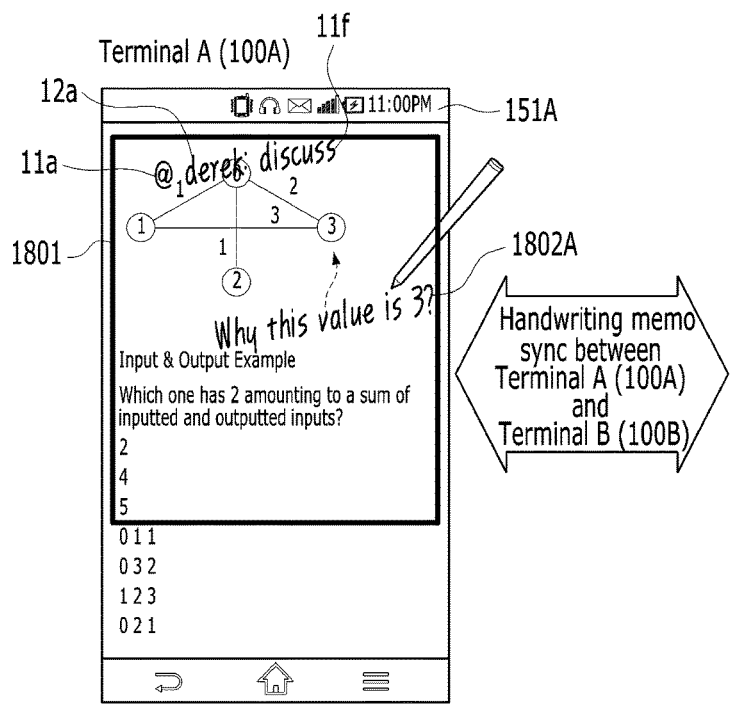
Figure 18B:
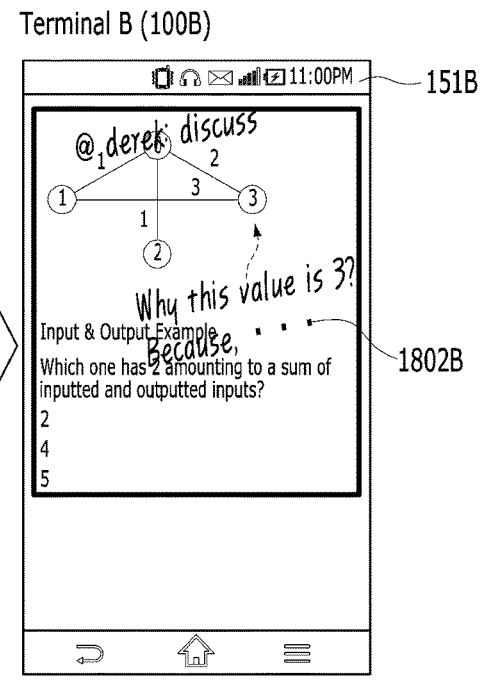

The designation of the counterpart terminal may be achieved through a $1^{st}$ mark 11a and a search word letter 12a inputted in continuation with the $1^{st}$ mark 11a. Referring to FIG. 18A, 'derek' is currently inputted as a search word letter 12a and a terminal mapped to the 'derek' may be designated as a counterpart terminal.

Moreover, the share command may include an input of a share letter 11f distinguished from the search word letter 12a. The share letter 11f is the command for executing a sharing and may include a handwriting input 'discuss' in the example shown in FIG. 18A.

A handwriting input performed on the designated shared region can be shared by being synchronized between the terminal A 100A and the terminal B 100B. In particular, a handwriting input A 1802A corresponding to the handwriting input applied to the terminal A 100A can be shared and displayed on the terminal B 100B. Likewise, a handwriting input B 1802B corresponding to the handwriting input applied to the terminal B 100B can be shared and displayed on the terminal A 100A.

Meanwhile, regarding the sharing method, the real-time synchronized control method shown in FIG. 18 is available. And, a sharing can be performed in a reply format like FIG. 19.

FIG. 19A is a diagram for a configuration of a terminal B 100B corresponding to a sharing counterpart terminal A shared region received from a terminal A 100A is displayed on a touchscreen B 151B and a handwriting input A 1802A is also displayed by being shared.

If a $1^{st}$ letter 11a and a reply command 11g are inputted to the touchscreen B 151B, the terminal B 100B can send a reply for the shared region to the terminal A 100A. In doing so, the reply for the shared region may be a reply that includes a handwriting input B 1802B corresponding to a handwriting input applied to the touchscreen B 151B [FIG. 19B].

Accordingly, embodiments of the present invention provide various effects and/or features.

According to at least one of embodiments of the present invention, it is able to easily execute a function using a stylus pen.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a memory;
a touchscreen; and
a controller configured to:
store in the memory a mapping of a different symbol to each of a plurality of applications;
cause the touchscreen to display a first running screen of a first application of the plurality of applications, wherein the first running screen comprises image content;
cause the touchscreen to display a handwriting graphic corresponding to a first handwriting input received at the touchscreen while the first running screen is displayed;
cause the touchscreen to display, after the first handwriting input is received at the touchscreen and when the first handwriting input is associated with a symbol that is mapped to a second application, a second running screen of the second application of the plurality of applications,
wherein the first running screen and the second running screen are concurrently displayed on the touchscreen,
wherein the second running screen comprises a portion of the image content displayed on the first running screen, and
wherein the portion of the image content of the second running screen is defined according to user selection of the portion of the image content displayed at the first running screen,
wherein the user selection of the portion of the image content at the first running screen is a touch and drag input forming a closed curve that encircles the portion of the image content at the first running screen.

2. The mobile terminal of claim 1, wherein the second application is a message application and wherein the controller is further configured to:
cause the touchscreen to display in the second running screen of the second application a party identifier for sending a message to a terminal associated with the party identifier, wherein the party identifier is defined according to a mapping of a second handwriting input received at the touchscreen.

3. The mobile terminal of claim 2, wherein the controller is further configured to:
attach the portion of the image content of the second running screen to the message for sending to the terminal associated with the party identifier.

4. The mobile terminal of claim 2, wherein the controller is further configured to:
cause the touchscreen to display in the second running screen of the second application, text that corresponds to a third handwriting input received at the touchscreen; and
attach the text of the second running screen to the message for sending to the terminal associated with the party identifier.

5. The mobile terminal of claim 4, wherein a location of the touchscreen at which the third handwriting input is received is different from a location at which the text is displayed in the second running screen.

6. The mobile terminal of claim 1, wherein the first running screen of the first application comprises a thumbnail list of a plurality of images, and wherein the portion of the image content of the second running screen comprises a first image of the plurality of images.

7. The mobile terminal of claim 6, wherein a size of the first image as displayed in the second running screen is smaller relative to a size of the first image as displayed in the thumbnail list.

8. The mobile terminal of claim 1, wherein the second application comprises a plurality of user selectable functions that are accessible when operating in a first mode, and when operating in a second mode at least one of the plurality of user selectable functions are not accessible.

9. A display method for a mobile terminal having a touchscreen and memory, the method comprising:
   storing in the memory a mapping of a different symbol to each of a plurality of applications;
   displaying on the touchscreen a first running screen of a first application of the plurality of applications, wherein the first running screen comprises image content;
   displaying on the touchscreen a handwriting graphic corresponding to a first handwriting input received at the touchscreen while the first running screen is displayed;
   displaying on the touchscreen, after the first handwriting input is received at the touchscreen and when the first handwriting input is associated with a symbol that is mapped to a second application, a second running screen of the second application of the plurality of applications wherein the first running screen and the second running screen are concurrently displayed on the touchscreen,
   wherein the second running screen comprises a portion of the image content displayed on the first running screen, and
   wherein the portion of the image content of the second running screen is defined according to user selection of the portion of the image content displayed at the first running screen,
   wherein the user selection of the portion of the image content at the first running screen is a touch and drag input forming a closed curve that encircles the portion of the image content at the first running screen.

10. The method of claim 9, wherein the second application is a message application and wherein the method further comprises:
    displaying on the touchscreen in the second running screen of the second application a party identifier for sending a message to a terminal associated with the party identifier, wherein the party identifier is defined according to a mapping of a second handwriting input received at the touchscreen.

11. The method of claim 10, wherein the method further comprises:
    attaching the portion of the image content of the second running screen to the message for sending to the terminal associated with the party identifier.

12. The method of claim 10, wherein the method further comprises:
    displaying on the touchscreen in the second running screen of the second application, text that corresponds to a third handwriting input received at the touchscreen; and
    attaching the text of the second running screen to the message for sending to the terminal associated with the party identifier.

13. The method of claim 12, wherein a location of the touchscreen at which the third handwriting input is received is different from a location at which the text is displayed in the second running screen.

14. The method of claim 9, wherein the first running screen of the first application comprises a thumbnail list of a plurality of images, and wherein the portion of the image content of the second running screen comprises a first image of the plurality of images.

15. The method of claim 14, wherein a size of the first image as displayed in the second running screen is smaller relative to a size of the first image as displayed in the thumbnail list.

16. The method of claim 9, wherein the second application comprises a plurality of user selectable functions that are accessible when operating in a first mode, and when operating in a second mode at least one of the plurality of user selectable functions are not accessible.

* * * * *